(12) United States Patent
Vaz et al.

(10) Patent No.: US 11,733,097 B2
(45) Date of Patent: Aug. 22, 2023

(54) FLUORESCENCE SPECTROSCOPIC METHOD USING POLYESTER COMPOSITION CONTAINING ADDITIVE TO PREVENT OXIDATIVE DEGRADATION, AND SUBSTRATE, OPTICAL FILTER, SECURITY DOCUMENT, AND SENSOR DEVICE CONTAINING THE POLYESTER COMPOSITION

(71) Applicant: TORAY FILMS EUROPE, Saint-Maurice-de-Beynost (FR)

(72) Inventors: Alberto Vaz, Sathonay-Camp (FR); Lucile Gambut-Garel, Lyons (FR)

(73) Assignee: TORAY FILMS EUROPE, Saint-Maurice-de-Beynost (FR)

( * ) Notice: Subject to any disclaimer, the term of this patent is extended or adjusted under 35 U.S.C. 154(b) by 148 days.

(21) Appl. No.: 17/291,012

(22) PCT Filed: Nov. 5, 2018

(86) PCT No.: PCT/IB2018/001384
§ 371 (c)(1),
(2) Date: May 4, 2021

(87) PCT Pub. No.: WO2020/095083
PCT Pub. Date: May 14, 2020

(65) Prior Publication Data
US 2022/0003606 A1    Jan. 6, 2022

(51) Int. Cl.
G01J 3/44 (2006.01)
C08L 67/02 (2006.01)
G01J 3/02 (2006.01)
G01N 21/64 (2006.01)

(52) U.S. Cl.
CPC ............ G01J 3/4406 (2013.01); C08L 67/02 (2013.01); G01J 3/0205 (2013.01); G01N 21/6428 (2013.01); G01N 2021/6417 (2013.01); G01N 2021/6439 (2013.01)

(58) Field of Classification Search
CPC .................................................... C08L 67/02
See application file for complete search history.

(56) References Cited

U.S. PATENT DOCUMENTS

| | | | |
|---|---|---|---|
| 7,402,381 B2 | 7/2008 | Takiguchi et al. | |
| 9,056,956 B2 * | 6/2015 | Kojima | C08G 63/20 |
| 2004/0234417 A1 | 11/2004 | Schienle et al. | |
| 2006/0153922 A1 | 7/2006 | Petersen et al. | |
| 2013/0075692 A1 | 3/2013 | Naasani et al. | |
| 2014/0147912 A1 | 5/2014 | Cho et al. | |

FOREIGN PATENT DOCUMENTS

| | | | | |
|---|---|---|---|---|
| CA | 2183204 | | 2/1997 | |
| CN | 102598027 A | * | 7/2012 | B42D 25/29 |
| EP | 0 762 122 | | 3/1997 | |
| EP | 2226657 A1 | * | 9/2010 | G02B 1/105 |
| EP | 2 495 283 | | 9/2012 | |
| JP | 4350172 B2 | * | 10/2009 | |
| WO | 01/73109 | | 10/2001 | |
| WO | 2004/040290 | | 5/2004 | |
| WO | 2006/065541 | | 6/2006 | |
| WO | WO-2006065541 A1 | * | 6/2006 | C07D 519/00 |
| WO | 2010/121362 | | 10/2010 | |

OTHER PUBLICATIONS

Lamprecht, Bernhard, et al. "Integrated waveguide sensor platform utilizing organic photodiodes." Plasmonics in Biology and Medicine IX. vol. 8234. SPIE, 2012. (Year: 2012).*
Lamprecht, Bernhard, et al. "Integrated waveguide sensor platform utilizing organic photodiodes." Plasmonics in Biology and Medicine IX. vol. 8234. SPIE, 2012. (Year: 2012) (Year: 2012).*
Parikha Mehrotra, "Biosensors and their applications—A review", Journal of Oral Biology and Craniofacial Research 6 (2016) 153-159.
M. Strianese et al., "Fluorescence-Based Biosensors", Methods in Molecular Biology, Mar. 2012.
B. Lamprecht et al., "Integrated waveguide sensor platform utilizing organic photodiodes", Plasmonics in Biology and Medicine IX, vol. 8234, No. 1, Feb. 9, 2012, pp. 1-9, XP060011886.
M. Yamazaki et al., "Non-emissive plastic colour filters for fluorescence detection", Lab on a Chip, Royal Society of Chemistry, vol. 12, No. 21, 2012, pp. 4313-4320, XP002695059.

* cited by examiner

Primary Examiner — Uzma Alam
Assistant Examiner — Huy Phillip Pham
(74) Attorney, Agent, or Firm — Clark & Brody LP

(57) ABSTRACT

The field of the invention is that of fluorescence spectroscopic methods. In particular, the present invention relates to a fluorescence spectroscopic method and to several products that can be analyzed using this method.

18 Claims, No Drawings

FLUORESCENCE SPECTROSCOPIC METHOD USING POLYESTER COMPOSITION CONTAINING ADDITIVE TO PREVENT OXIDATIVE DEGRADATION, AND SUBSTRATE, OPTICAL FILTER, SECURITY DOCUMENT, AND SENSOR DEVICE CONTAINING THE POLYESTER COMPOSITION

TECHNICAL FIELD

The field of the invention is that of fluorescence spectroscopic methods. In particular, the present invention relates to a fluorescence spectroscopic method and to several products that can be analyzed using this method.

BACKGROUND ART

Fluorescence spectroscopy is a spectroscopic method which is generally used to determine the concentration of an analyte in a sample, based on the fluorescence properties of the analyte. Depending on the wavelength of the light that is absorbed by the sample (excitation wavelength), it is possible to record the emission spectrum of the sample (the light that is emitted by the sample). It is then possible to correlate the intensity of the signals to the quantity of analyte. Fluorescence is a very widespread technique, which is useful in numerous application fields like chemistry, biology and medicine. However, with this technique, it is the spectrum of the whole sample (including the substrate which holds the sample) that is recorded. In order to avoid interferences of the substrate's fluorescence with the analyte's fluorescence, blank measurements can be carried out. However, even if blank measurements are performed, interferences can still be observed, especially if the substrate has a high fluorescence absorption and/or emission. This can lead to deviations or loss of sensibility in the calculated concentration of the analyte. Therefore, it would be interesting to have a support which has very low fluorescence absorption and/or emission signals.

In this context, one of the essential aims of the invention is to provide a fluorescence spectroscopic method which implements a substrate having a low fluorescence absorption and/or emission signal.

Another essential aim of the invention is to provide a fluorescence spectroscopic method which implements a substrate which has a low fluorescent background noise.

Another essential aim of the invention is to provide a fluorescence spectroscopic method which is more precise and more sensitive.

Another essential aim of the invention is to provide a fluorescence spectroscopic method which has a low detection threshold.

Another essential aim of the present invention is to provide a product, which can be analyzed using a fluorescence spectroscopic method, comprising a substrate having a low fluorescence absorption and/or emission signal.

Another essential aim of the invention is to provide a product, which can be analyzed using a fluorescence spectroscopic method, comprising a substrate having a low fluorescent background noise.

SUMMARY

These objectives, among others, are achieved by the present invention which relates, in a first aspect, to a fluorescence spectroscopic method comprising the following steps:

a) implementing:
  at least one product to be irradiated, comprising at least one substrate and, optionally, at least one analyte,
  at least one light source for irradiating the product(s),
  optionally, at least one optical filter;
b) irradiating the product with the light source(s);
c) assessing the fluorescence excitation and/or emission of the product, qualitatively and/or quantitatively,
wherein the substrate and/or the optical filter, if present, comprise(s) a polyester composition having an excitation signal at 485 nm and/or an emission signal at 535 nm, of less than or equal to 500 units of fluorescence intensity, preferably less than or equal to 300 units.

The use of a polyester composition having low excitation signal at 485 nm and/or emission signal at 535 nm allows for little interferences, in terms of fluorescence, between the substrate and/or the optical filter and the analyte. The use of this polyester composition results in lower fluorescent background noise. The fluorescent spectroscopic method is therefore more precise and more sensitive, and the detection threshold is lowered. The fluorescent spectroscopic method is also more reliable.

In a second aspect, the invention relates to a substrate for a sensor device, said substrate comprising a polyester composition having an excitation signal at 485 nm and/or an emission signal at 535 nm, of less than or equal to 500 units of fluorescence intensity, preferably less than or equal to 300 units. The terms "sensor device" refers to a device which detects or measures a physical property and records, indicates, or otherwise responds to it.

In a third aspect, the invention relates to a security document comprising a polyester composition having an excitation signal at 485 nm and/or an emission signal at 535 rim, of less than or equal to 500 units of fluorescence intensity, preferably less than or equal to 300 units. A security document is a document comprising at least one security feature. The fluorescence method according to the invention can be used, for example, to detect a security feature from the security document.

In a fourth aspect, the invention relates to an optical filter comprising a polyester composition having an excitation signal at 485 rim and/or an emission signal at 535 nm of less than or equal to 500 units of fluorescence intensity, preferably less than or equal to 300 units, and an additive chosen among titanium dioxide, light stabilizers, and mixtures thereof. The optical filter can be used to selectively transmit light of specific wavelengths.

DETAILED DESCRIPTION

The fluorescence spectroscopic method
In a first aspect, the invention relates to a fluorescence spectroscopic method comprising the following steps:
a) implementing:
  at least one product to be irradiated, comprising at least one substrate and, optionally, at least one analyte,
  at least one light source for irradiating the products),
  optionally, at least one optical filter;
b) irradiating the product with the light source(s);
c) assessing the fluorescence excitation and/or emission of the product, qualitatively and/or quantitatively,
wherein the substrate and/or the optical filter, if present, comprise(s) a polyester composition having an excitation signal at 485 nm and/or an emission signal at 535 nm, of less than or equal to 500 units of fluorescence intensity, preferably less than or equal to 300 units.

The product to be irradiated can be any type of product that can be analyzed by fluorescence spectroscopy. For example, the product to be irradiated can be a sensor device for the detection of the analyte, like a biosensor; a security document; a microfluidic chip; or a cuvette comprising a sample. According to an embodiment of the method, the product is a sensor device for the detection of the analyte. According to another embodiment, the product is a security document.

The product comprises at least one substrate and, optionally, at least one analyte. The analyte can be present or absent. The substrate can support the analyte.

The substrate is a solid support that can comprise any type of organic or inorganic material, like polymer, silicone or glass. The substrate can comprise the polyester composition.

When the analyte is present, advantageously, the fluorescence excitation and/or emission of the analyte are determined. Therefore, in a preferred embodiment, the analyte has fluorescent properties that can be analyzed by fluorescent spectroscopy. The analyte itself can have intrinsic fluorescent properties, or it can be labeled with a compound having fluorescent properties.

In the present disclosure, the term "analyte" encompasses both labeled and non-labeled analytes.

According to an embodiment of the method, the analyte is chosen from:
  molecules of biological relevance, like proteins, peptides, nucleic acids, amino acids, carbohydrates, vitamins or fatty acids;
  fluorescent small molecules, like fluorescent dyes;
  quantum dots, like semiconductor nanostructures;
  fluorescent oligomers or polymers;
  and mixtures thereof.

According to an embodiment of the method, the analyte is glucose.

According to an embodiment of the method, at least one optical filter is present. The optical filter is especially useful when the product to be irradiated is a microfluidic chip, or to protect a product from radiation, for example from UV radiation. For example, one or 2 optical filters can be present. The optical filter selects the wavelength(s) of the light that is transmitted, for example the wavelength(s) of the light that is transmitted from the light source to the product or the wavelength(s) of the light that is transmitted from the product to a detector.

Any type of light source that is normally used in fluorescence spectroscopy can be used to irradiate the product. The person skilled in the art would know what type of light source to use. Among the light sources which can be used in the present method, one can cite lasers, LED, lamps, or their combination. Arc lamps, like xenon arc lamp, or mercury lamp can be indicated.

After the irradiation step b), the fluorescence excitation and/or emission of the product is assessed in step c). This assessment can be done qualitatively and/or quantitatively. Step c) can be done using a detector, preferably a detector comprising a photomultiplier. The detector can be included in the sensor device. The person skilled in the art would know what type of detector to use. The use of a detector allows for quantitative assessment of the analyte comprised in the product.

Different set ups can be used in the method. If one optical filter is present, it can be placed between the light source and the product to be irradiated or between the product to be irradiated and the detector. If two optical filters are present, they can be placed between the light source and the product to be irradiated and between the product to be irradiated and the detector.

According to an embodiment, it is the substrate that comprises the polyester composition. According to another embodiment, it is the optical filter that comprises the polyester composition. According to another embodiment, it is the substrate and the optical filter that comprise the polyester composition.

Polyester Composition

The substrate and/or the optical filter, if present, comprise(s) a polyester composition having an excitation signal at 485 nm and/or an emission signal at 535 nm of less than or equal to 500 units of fluorescence intensity, preferably less than or equal to 300 units, more preferably less than or equal to 250 units.

In addition, the polyester composition can also have:
  an excitation signal at 485 nm and/or an emission signal at 675 nm of less than or equal to 500 units of fluorescence intensity, preferably less than or equal to 300 units, or
  an excitation signal at 340 nm and/or an emission signal at 615 nm of less than or equal to 500 units of fluorescence intensity, preferably less than or equal to 300 units.

The excitation signal at 485 rim and/or an emission signal at 535 nm of the polyester composition can be determined by fluorescence spectroscopy, for example using a Synergy™ Mx of BioTek apparatus with the following parameters:
  Detection method: fluorescence
  Lecture mode: endpoints
  Lecture speed: normal
  Excitation wavelength: 485 nm with a filter at 20 nm
  Emission wavelength: 535 nm with a filter at 20 nm
  Sensitivity: 105
  Measurement depth: 4 mm According to an embodiment, the polyester composition has an excitation signal at 485 nm and/or an emission signal at 535 rim, which is at least 10% lower than a reference composition, preferably 15% lower. For example, a film comprising the polyester composition has an excitation signal at 485 nm and/or an emission signal at 535 nm, which is at least 10% lower than a reference film. Both films can have a thickness of 100 μm. The reference film can be a 3-layers film having a MNM structure, wherein M and N have the following compositions:
  M: 55% of polyethylene terephthalate composition having an intrinsic viscosity of 0.6 dL/g and 45% of polyethylene terephthalate composition comprising 7000 ppm of silica,
  N: 100% of polyethylene terephthalate composition having an intrinsic viscosity of 0.6 dL/g.

In a preferred embodiment, the polyester composition includes at least one additive for preventing the oxidative degradation of the polyester.

The additive for preventing the oxidative degradation of the polyester is preferably chosen from acid scavengers, antioxidant stabilizers, and mixtures thereof. Examples of antioxidant stabilizers include phosphites, phenols and phosphates. Phosphites include tris(2,4-di-tert-butyl) phosphite and bis(2,4-di-tert-butylphenol) pentaerythritol diphosphite (i.e BASF Irgafos® 126, 128). Phenols include hindered phenols like pentaerythritol tetrakis(3-(3,5-di-tert-butyl-4-hydroxyphenyl) propionate (i.e BASF Irganox® 1010). Phosphates include sodium dihydrogen phosphate.

The inventors unexpectedly discovered that the addition of an additive preventing the oxidative degradation of the polyester to a polyester composition resulted in a lower excitation signal at 485 nm and/or emission signal at 535 nm, of the polyester composition compared to polyester compositions which do not comprise such additive.

The quantity of additive for preventing the oxidative degradation of the polyester is conditioned by the solubility of the additive in the polyester composition. For example, the quantity can be comprised between 0.5 mol/ton of composition to 10.0 mol/ton of composition, preferably between 1.0 mol/ton of composition to 5.0 mol/ton of composition.

Advantageously, the intrinsic viscosity of the composition is greater than or equal to 0.5 dL/g, preferably 0.6 dL/g.

The intrinsic viscosity can be determined by dissolving a given quantity of a sample (polymer or film) in one or several solvent (usually a solvent mixture of 1,2-dichlorobenzene/phenol 50/50). The flow time of the sample solution (polymeric solution) and of the solvent are then measured with an 1.Jbbelohde viscosimeter, and the intrinsic viscosity is determined using the Billmeyer equation:

$$IV = \frac{\eta_{rel} - 1 + 3*\ln(\eta_{rel})}{4*c}$$

where c is the concentration of the polymeric solution (in g/dl), usually 0.5 g/dl; $\eta_{rel}$ is the relative viscosity=t/t0;

t is the flow time of the polymeric solution at concentration c; and $t_0$ is the flow time of the solvent.

According to a specific embodiment of the method, the additive preventing the oxidative degradation of the polyester includes:

an alkali metal compound in an amount of 1.0 mol/ton of composition to 3.0 mol/ton of composition in terms of alkali metal element; and a phosphorus compound in an amount of 1.0 mol/ton of composition to 5.0 mol/ton of composition in terms of elemental phosphorus.

According to an embodiment, the polyester composition comprises an alkali metal compound in an amount of 1.0 mol/ton of composition to 2.0 mol/ton of composition.

The alkali metal element contained in the polyester composition is preferably selected from sodium, potassium, lithium and mixtures thereof. Thereamong, it is preferred that the alkali metal element be sodium or potassium. It is also preferred that the compound containing the alkali metal element be a hydroxide or phosphate, like sodium phosphate. According to a preferred embodiment of the method, the compound containing the alkali metal element is sodium dihydrogen phosphate.

According to an embodiment of the method, the polyester composition comprises a phosphorus compound in an amount of 1.5 mol/ton of composition to 4.0 mol/ton of composition in terms of elemental phosphorus.

The compound containing elemental phosphorus can be selected from phosphoric acid, phosphoric acid ester alkali metal phosphate, and mixtures thereof.

In the polyester composition, the molar ratio of alkaline earth metal element to elemental phosphorus is preferably comprised between 0.5 and 1.5, more preferably between 0.7 and 1.3.

In the polyester composition, the amount of COOH terminal groups is preferably not greater than 60 eq/ton of composition, more preferably not greater than 50 eq/ton of composition.

According to an embodiment of the method, the polyester composition comprises at least one additive selected from heat-resistant stabilizer, UV absorbing agent, UV stabilizer, organic/inorganic lubricant, organic/inorganic fine particle, filler, nucleating agent, dye, dispersant, coupling agent, and mixtures thereof.

Preferably, the number average molecular weight of the polyester composition is not less than 10,000.

The polyester composition can be obtained in standard fashion starting from one or more aromatic dicarboxylic acids or derivatives thereof (esters of lower aliphatic alcohols or halides for example) and from one or more aliphatic diols (glycols). As examples of aromatic acids, mention may be made of the phthalic, terephthalic, isophthalic, naphthalene-2,5-dicarboxylic, naphthalene-2,6-dicarboxylic acids, and 2,5-furandicarboxylic acid. As non-limitative examples of aliphatic diols, mention may be made of ethylene glycol, propane-1,3-diol and butane-1,4-diol.

Specific examples of aromatic polyesters are in particular polyethylene terephthalate (PET), polyethylene isophthalate, polybutylene terephthalate, poly-(dimethyl-1,4-cyclohexylene terephthalate), polyethylene-2,6-naphthalene dicarboxylate and polyethylene 2,5-furandicarboxylate.

According to a preferred embodiment, the polyester composition comprises polyethylene terephthalate. In this case, the polyester composition is a polyethylene terephthalate composition.

According to an embodiment of the method, the polyethylene terephthalate composition comprises not less than 80 mol % of ethylene terephthalate units as constitutional unit, preferably not less than 95 mol %, and more preferably not less than 99 mol %.

According to an embodiment of the method, the polyethylene terephthalate composition comprises of at least one additive for preventing the oxidative degradation of the polyester in an amount of 0.5 mol/ton of composition to 10.0 mol/ton of composition, preferably of 1.0 mol/ton of composition to 5.0 mol/ton of composition, said additive being chosen from acid scavengers, antioxidant stabilizers, and mixtures thereof.

According to a specific embodiment of the method, the polyethylene terephthalate composition comprises at least one additive for preventing the oxidative degradation of the polyester including:

an alkali metal compound in an amount of 1.0 mol/ton of composition to 3.0 mol/ton of composition in terms of alkali metal element; and a phosphorus compound in an amount of 1.5 mol/ton of composition to 4.0 mol/ton of composition in terms of elemental phosphorus.

Advantageously, the polyethylene terephthalate composition has an intrinsic viscosity greater than or equal to 0.5 dL/g, preferably 0.6 dL/g.

The polyethylene terephthalate composition according to the present invention can be produced by perfoiiuing polycondensation reactions and esterification or transesterification reactions.

Film comprising at least one layer composed of the polyester composition

According to a preferred embodiment, the substrate and/or the optical filter, if present, comprise(s) a film comprising at least one layer composed of the polyester composition.

According to a preferred embodiment of the method, the film comprising at least one layer composed of the polyester composition is a bi-axially stretched film. The film can be stretched either by a sequential biaxial stretching method in which stretching is performed separately in the longitudinal direction and the transverse direction, or by a simultaneous biaxial stretching method in which stretching is performed simultaneously in both the longitudinal and transverse directions.

The stretching temperature is for example comprised between the glass transition temperature Tg and a temperature at most equal to Tg 60° C. in the longitudinal direction as well as in the transverse direction.

For example, longitudinal direction stretching can be carried out 3 to 6 times and transverse stretching for example 3 to 5 times.

In general, following the stretching operation or operations, the film undergoes a step of thermosetting. As an example, for PET, thermosetting is carried out between 180° C. and 250° C. (for example at 240° C.) for 1 to 60 seconds for example and then at a lower temperature in order to stabilize the film.

The film may be oriented or not. The stretching sequences for obtaining an oriented film may be different depending on the machines used, without affecting the properties obtained by means of the invention. For example, so-called inverse-sequence machines or multistep machines, machines with alternating sequences or machines with simultaneous stretching, etc., may usefully be used.

Advantageously, the film comprising at least one layer composed of the polyester composition is a multilayer film, preferably a two-layer film or a three-layer film. The layer(s) can be according to an M, MN, MNM or MNO structure where M is different from N and O, N is different from O. The main layer can be framed by one or two identical layers or not, in terms of thickness and/or composition. Each of the layers can be composed of the polyester composition as defined above. Preferably, the film is a three-layer film wherein the main layer of the polyester composition is framed by two layers composed of a different material.

Advantageously, the film comprising at least one layer composed of the polyester composition has a thickness comprised between 1 and 500 µm, preferably between 2 and 400 µm, more preferably between 3 and 350 µm.

According to a preferred embodiment of the method, the substrate and/or the optical filter, if present, comprise(s) a film comprising at least one layer composed of a polyester composition, preferably a polyethylene terephthalate composition, comprising at least one additive for preventing the oxidative degradation of the polyester in an amount of 0.5 mol/ton of composition to 10.0 mol/ton of composition, preferably of 1.0 mol/ton of composition to 5.0 mol/ton of composition, said additive being chosen from acid scavengers, antioxidant stabilizers, and mixtures thereof.

According to a preferred embodiment of the method, the substrate and/or the optical filter, if present, comprise(s) a film comprising at least one layer composed of a polyester composition, preferably a polyethylene terephthalate composition, comprising at least one additive for preventing the oxidative degradation of the polyester including:
- an alkali metal compound in an amount of 1.0 mol/ton of composition to 3.0 mol/ton of composition in terms of alkali metal element; and
- a phosphorus compound in an amount of 1.5 mol/ton of composition to 4.0 mol/ton of composition in terms of elemental phosphorus.

Substrate for a Sensor Device

The invention also relates to a substrate for a sensor device, said substrate comprising a polyester composition having an excitation signal at 485 nm and/or an emission signal at 535 nm of less than or equal to 500 units of fluorescence intensity, preferably less than or equal to 300 units.

The invention also relates to a sensor device comprising a substrate as described above. Sensor devices are well described in the art (see for example U.S. Pat. No. 7,402,381 B2, US2014 /0147912 A, or US2006/0153922).

The sensor device can be used to measure the level of the analyte in a fluid, for example a body fluid like blood. The sensor device can be a chemical sensor or a biosensor, which is a sensor comprising a biological element. The sensor device can also comprise a reagent for reacting with the analyte. According to a preferred embodiment, the sensor device is a biosensor, more preferably a fluorescent biosensor. A biosensor comprises a receptor component to capture a target analyte and a signal transduction component to convert the analyte-binding event into measurable signals, such as fluorescence, chemiluminescence, colorimetric, electrochemical, and magnetic responses. In the case of fluorescent biosensors, the measurable signal is a fluorescence signal. The fluorescent biosensor thus comprises a light source, as well as a photodetector. Fluorescent biosensors are well described in the literature (see EP 0 762 122, US2004/0234417, Parikha Mehrotra, *J. Oral Biol. Craniofac. Res.* 2016 May-Aug.; 6(2): 153-159, Maria Strianese et al. *Spectroscopic Methods of Analysis: Methods and Protocols,* Methods in Molecular Biology, vol. 875. March 2012 Editors: Bujalowski, Wiodek M.).

According to a preferred embodiment, the sensor device is a sensor for measuring the level of glucose in a blood sample.

Security Document

The invention also relates to a security document comprising a polyester composition having an excitation signal at 485 nm and/or an emission signal at 535 mn of less than or equal to 500 units of fluorescence intensity, preferably less than or equal to 300 units.

A security document is a document comprising at least one security feature. The security feature can be selected from intaglio printing, microprinting, optically variable color-changing inks, holograms, magnetic ink, serial number, anti-copying marks, halo, fluorescent dyes, UV-fluorescent inks, electronic devices, thermochromatic ink, and combinations thereof.

Advantageously, the security feature is a fluorescent dye or a UV-fluorescent ink.

The fluorescence method according to the invention can be used, for example, to detect a security feature from the security document.

Examples of security document include, but are not limited to, banknotes, ID cards, driving license, passports, cheques, labels, certificates and stamps.

Optical Filter

The invention also relates to an optical filter comprising a polyester composition having an excitation signal at 485 nm and/or an emission signal at 535 nm of less than or equal to 500 units of fluorescence intensity, preferably less than or equal to 300 units, and an additive chosen among titanium dioxide, light stabilizers, and mixtures thereof.

The optical filter is especially useful when the product to be irradiated is a microfluidic chip, or to protect a product from radiation, for example from UV radiation. The optical filter can also be used in a biosensor, especially a fluorescent biosensor.

The optical filter can be used to selectively transmit light of specific wavelengths.

EXAMPLES

Fluorescent Measurements:

Measurements were performed using a Synergy™ Mx of BioTek apparatus using the following parameters:
Detection method: fluorescence
Lecture mode: endpoints
Lecture speed: normal
Excitation wavelength: 485 nm with a filter at 20 nm
Emission wavelength: 535 nm with a filter at 20 nm
Sensitivity: 105
Measurement depth: 4 mm First a blank measurement is performed with only the sample holder. Then the film to analyse is placed on the sample holder and a second measurement is performed. Finally, the fluorescence value of the film is calculated by subtracting the value of the blank measurement.

Intrinsec Viscosity:

A sample solution is obtained by dissolution of a given quantity of the sample (polymer or film) at least at 120° C. for 30 min in 100 mL of a solvent mixture of 1,2-dichlorobenzene/phenol 50150 (concentration 0.5 g/dl). After cooling down, the flow time of the sample solution (polymeric solution) and of the solvent are measured with an Ubbelohde viscosimeter. The thermostatic bath viscometer is set at 25° C.

The intrinsic viscosity (IV) is then calculated using the Billmeyer equation:

$$IV = \frac{\eta_{rel} - 1 + 3*\ln(\eta_{rel})}{4*c}$$

where c is the concentration of the polymeric solution (in g/dl);
$\eta_{rel}$ is the relative viscosity t/t0;
t is the flow time of the polymeric solution at concentration c; and
$t_0$ is the flow time of the solvent.

Materials Used:

PET1: polyethylene terephthalate composition having an intrinsic viscosity of 0.6 dL/g, PET1HV: polyethylene terephthalate composition having an intrinsic viscosity of 0.7 dL/g, developed by Toray Films Europe, PET2HV: polyethylene terephthalate composition having an intrinsic viscosity of 0.7 dL/g developed by Toray Plastic America, PET3 : polyethylene terephthalate composition comprising a copolymer of isophtalic acid, MBI : polyethylene terephthalate composition comprising 7000 ppm of silica, NPET1: polyethylene terephthalate composition according to the invention comprising 1.67 mol of $NaH_2PO_4$, $2H_2O$/ton of composition and a COOH terminal group content between 20 and 50 mol/ton of composition and having an intrinsic viscosity of 0.7 dL/g NPET2: polyethylene terephthalate composition according to the invention comprising 1.67 mol of $NaH_2PO_4$, $2H_2O$/ton of composition and a COOH terminal group content inferior to 30 mol/ton of composition, and having an intrinsic viscosity of 0.8 dL/g.

Films

Films were produced using the above mentioned materials. The polyester films are produced according to a process known in the art and described for example in U.S. Pat. No. 4,226,826.

The polyester film is obtained by melt extrusion through a slot die, which produces a polyester molten web, which is then cooled and solidified to obtain an unstretched sheet. The sheet thus obtained by quenching-solidification is stretched in the longitudinal direction and in the transverse direction. Thereafter, the resulting film is cooled to room temperature and wound to obtain a roll of film. All the films have 3 layers with a A/B/A configuration.

The obtained films were then analyzed by fluorescence spectroscopy, the emission spectra at 535 nm after excitation at 485 nm were recorded.

The structures of the films and the results of the fluorescence spectroscopy are presented in table 1.

TABLE 1

Composition of the films and emission signals at 535 nm after excitation at 485 nm

| Example | Thickness | Composition in principal line | Emission at 535 nm after excitation at 485 nm |
|---|---|---|---|
| Ex. 1 | 50 μm | A: 70% PET2 30% MB1<br>B: 100% NPET1 | 204 |
| Ex. 2 | 50 μm | A: 70% PET1 30% MB1<br>B: 100% NPET2 | 220 |
| Ex. 3 | 100 μm | A: 70% PET2 30% MB1<br>B: 100% NPET1 | 495 |
| Comp. Ex. 1 | 50 μm | A: 70% PET1 30% MB1<br>B: 100% PET1 | 252 |
| Comp. Ex. 2 | 50 μm | A: 70% PET2 30% MB1<br>B: 100% PET2 | 289 |
| Comp. Ex. 3 | 50 μm | A: 70% PET1 30% MB1<br>B: 95% PET1 et 5% PET3 | 279 |
| Comp. Ex. 4 | 50 μm | A: 55% PET1 et 45% MB1<br>B: 100% PET1 | 349 |
| Comp. Ex. 5 | 75 μm | A: 55% PET1 et 45% MB1<br>B: 100% PET1 | 427 |
| Comp. Ex. 6 | 100 μm | A: 55% PET1 et 45% MB1<br>B: 100% PET1 | 621 |
| Comp. Ex. 7 | 50 μm | A: 70% PET1 30% MB1<br>B: 100% PET1 HV | 341 |
| Comp. Ex. 8 | 50 μm | A: 70% PET2 30% MB1<br>B: 100% PET1 HV | 343 |

The results for examples 1, 2 or 3 show that the films comprising a polyester composition according to the invention have fluorescence absorption and emission which are much lower than those of standard PET films (Comp. Ex. 1 to 6). In particular, the polyester composition comprising an additive for preventing the oxidative degradation of the polyester ($NaH_2PO_4$, which is an antioxidant stabilizer) have very low fluorescence, which results in in lower fluorescent background noise and a measurement which is more reliable.

The invention claimed is:
1. A fluorescence spectroscopic method comprising the following steps:
a) implementing:
at least one product to be irradiated, comprising at least one substrate,
at least one light source for irradiating the product(s),
b) irradiating the product with the light source(s);
c) assessing the fluorescence excitation and/or emission of the product, qualitatively and/or quantitatively, wherein the substrate comprises a polyester composition, the polyester composition comprising at least one additive for preventing oxidative degradation of the polyester and having an excitation signal at 485 nm and/or an emission signal at 535 nm, of less than or equal to 500 units of fluorescence intensity.

2. The method according to claim 1, wherein the polyester composition has an excitation signal at 485 nm and/or an emission signal at 535 nm which is at least 10% lower than a reference composition.

3. The method according to claim 1, wherein the additive preventing the oxidative degradation of the polyester is chosen from acid scavengers, antioxidant stabilizers, and mixtures thereof.

4. The method according to claim 1, wherein the additive preventing the oxidative degradation of the polyester includes:
- an alkali metal compound in an amount of 1.0 mol/ton of composition to 3.0 mol/ton of composition in terms of alkali metal element; and
- a phosphorus compound in an amount of 1.5 mol/ton of composition to 4.0 mol/ton of composition in terms of elemental phosphorus.

5. The method according to claim 1, wherein the substrate comprises a film comprising at least one layer composed of the polyester composition.

6. The method according to claim 5, wherein the film is a bimaxially stretched film.

7. The method according to claim 5, wherein the film is a multilayer film.

8. The method according to claim 5, wherein the film has a thickness comprised between 1 and 500 μm.

9. The method according to claim 1, wherein the polyester composition comprises polyethylene terephthalate.

10. The method according to claim 1 herein the product is a sensor device for the detection of the analyte.

11. The method according to claim 1, wherein the product is a security document.

12. The method according to claim 1, wherein step c) is performed using a detector.

13. The method according to claim 1, wherein the product to be irradiated comprises at least one substrate and at least one analyte.

14. The method according to claim 1, wherein the method implements at least one optical filter, wherein the optical filter comprises said polyester composition.

15. A substrate for a sensor device, said substrate comprising a polyester composition, the polyester composition comprising at least one additive for preventing oxidative degradation of the polyester and having an excitation signal at 485 nm and/or an emission signal at 535 nm of less than or equal to 500 units of fluorescence intensity.

16. A sensor device comprising a substrate according to claim 15.

17. A security document comprising a polyester composition, the polyester composition comprising at least one additive for preventing oxidative degradation of the polyester and having an excitation signal at 485 nm and/or an emission signal at 535 nm of less than or equal to 500 units of fluorescence intensity.

18. An optical filter comprising a polyester composition, the polyester composition comprising at least one additive for preventing oxidative degradation of the polyester and having an excitation signal at 485 nm and/or an emission signal at 535 nm of less than or equal to 500 units of fluorescence intensity, and an additive chosen among titanium dioxide, light stabilizers, and mixtures thereof.

* * * * *